United States Patent [19]

Lucas

[11] Patent Number: 5,272,987
[45] Date of Patent: Dec. 28, 1993

[54] LOCK FOR RAILWAY HOPPER CAR UNLOADING GATE

[75] Inventor: Anthony L. Lucas, McPherson, Kans.

[73] Assignee: Keystone Railway Equipment Company, Mechanicsburg, Pa.

[21] Appl. No.: 11,377

[22] Filed: Jan. 29, 1993

[51] Int. Cl.⁵ ............................................. B61D 7/00
[52] U.S. Cl. ............................. 105/308.1; 105/282.3
[58] Field of Search ............... 105/282.3, 282.1, 282.2, 105/296, 305, 308.1, 310, 311.1, 313; 292/142, 160, 172; 74/422; 49/362

[56] References Cited

U.S. PATENT DOCUMENTS

| | | | |
|---|---|---|---|
| 674,447 | 5/1901 | Mase | 74/422 |
| 1,080,280 | 12/1913 | Hult | 74/422 |
| 3,248,026 | 4/1966 | Kemp | 105/282 |
| 3,415,204 | 12/1968 | Pase | 105/305 |
| 4,228,696 | 10/1980 | Jablonsky | 74/422 |
| 4,253,400 | 3/1981 | Fischer et al. | 105/282.3 |
| 4,342,267 | 8/1982 | Blout | 105/282 |
| 5,046,432 | 9/1991 | Bowter | 105/282 |

FOREIGN PATENT DOCUMENTS

0471855  11/1914  France ....................... 292/172

Primary Examiner—Mark T. Le
Attorney, Agent, or Firm—Thomas Hooker

[57] ABSTRACT

The invention is a resilient lock for a gear drive railway car hopper gate. The lock prevents undesired opening of the gate and spilling of the contents of a railway hopper car. A resilient locking member is located between teeth of one gear and engages teeth of another gear to prevent accidental opening.

24 Claims, 6 Drawing Sheets

LOCK FOR RAILWAY HOPPER CAR UNLOADING GATE

FIELD OF THE INVENTION

This invention relates to a lock for a railway hopper car unloading gate.

DESCRIPTION OF THE PRIOR ART

Railway hopper cars are used to transport particulate bulk material. The hopper cars have a hollow body with an opening at the top of the body and one or more hoppers at the bottom of the body. Each hopper has a gate with an inwardly tapered frame defining a bulk material discharge mouth located at the bottom of the body. The frame supports a plate movable between a closed position where the plate closes the gate and an open position to permit discharge of material through the mouth.

Empty railway hopper cars are loaded with bulk material through the opening at the top of the cars to fill the hoppers. Loaded cars are transported to an unloading destination. When the car reaches its destination, the bulk material is unloaded from the car through the discharge mouth at the bottom of each hopper. The plate closes the mouth of each hopper during the loading and transportation of the hopper car. When the plate is are moved to the open position the particulate bulk material gravity falls down through the mouth and is discharged.

During transport vibration of the hopper car can cause the plate to open, resulting in undesired spilling and wasting the hopper contents. Because the particulate material may be of small size, slighter opening a plate may allow appreciable cargo to spill from the hopper car. Locks are used conventionally to secure the plate in the fully closed position.

SUMMARY OF THE INVENTION

The present invention is an improved lock for a railway hopper car unloading gate using a gear drive to shift the plate. The gate is preferably opened and closed by a gear drive including racks on the plate engagable with driven pinion gears. A lock member mounted on the top of each rack away from the pinion gear includes a compressible spring member which extends into a slot between a pair of adjacent rack teeth. The plate is moved between the closed and open positions by rotating the pinion gears. Initial rotation of the pinion gears moves a tooth on each pinion gear into a valley below the slot and against the lock member. When the tooth engages the lock member, rotation of the pinion gear and movement of the plate are resisted. Increased torque must be applied to the pinion gears in order to deform the spring members outward from their normal location between the adjacent rack teeth, permitting further movement of the racks and movement of the plate to the open position.

Forces exerted on the plate during transport of the hopper car are insufficient to shift the plate and bring teeth on the pinion gears into engagement with the spring members, compress the spring members and open the gate. The spring members effectively lock the gate closed until a high torque is applied to the pinion gear immediately prior to unloading.

A first embodiment of the invention includes L-shaped cantilever lock members each having an elongate body located on the top of a rack. One end of the elongated body is secured to the rack. A short right angle contact finger joins the other end of the body and extends through the seat between two adjacent rack teeth and into the valleys between two rack teeth.

The gate is opened from the closed position by rotation of the pinion gear. Opening of the gate is impeded as a tooth of the pinion gear engages the end of the finger. As torque applied to the pinion gear is increased, the finger is displaced outward from between the teeth of the rack and the body is flexed above the rack. The added force required to shift the lock member resists accidental opening of the gate.

A second embodiment of the invention includes a vertically oriented locking member having a solid spring body made of a resilient material. The body is tightly fitted within the slot between two adjacent rack teeth and extends into the valley. The fit assures that the spring body is compressed without flexing when contacted by a tooth on the pinion gear. The top of the spring body is fastened to the top of the rack.

Opening of the gate is impeded when a tooth on the pinion gear engages the bottom of the spring body. As torque applied to the pinion gear is increased, the resilient spring body is compressed between the teeth of the rack and the plate is moved to the open position. The spring body prevents accidental opening of the gate.

A third embodiment of the invention includes a locking member, having three vertically oriented coil springs extending through the slot between two adjacent rack teeth and into the valley. The upper end of each spring joins a support plate fastened to the top of the rack. The lower end of each spring is secured to a contact plate. A collapsible concentric sleeve surrounds the springs. The sleeve holds the springs to prevent lateral bending during compression. Opening of the gate is impeded as a tooth on the pinion gear engages the contact plate as described previously.

The locking members resist accidental opening of the hopper gate. There is minimal wear to the drive pinion gears and locking members as pinion gear teeth engage the locking members, assuring a reliable and long term lock for the gate. The lock is inexpensive and easily installed on the rack or racks of conventional hopper car gates. The improved lock can be easily retrofitted on existing hopper gates using a rack gear drive. The lock can also be used with gate assemblies using gear drives other than rack and pinion drives.

Other objects and features of the invention will become apparent as the description proceeds, especially when taken in conjunction with the accompanying drawings illustrating the invention, of which there are six sheets and three embodiments.

DESCRIPTION OF THE PREFERRED EMBODIMENTS

The first embodiment of the invention as shown in FIGS. 1 through 5 includes gate assembly 12 for a railway hopper car having a hopper frame 14 which forms chute 16 and defines mouth 18 at the bottom of the chute. Rectangular closure plate 2 is supported by the hopper frame and is slidable within the frame between a closed position across the mouth, and an open position remote from the mouth. Plate 20 is movable between the open and closed positions by gear drive 22 which includes pair of linear racks 24 mounted on the bottom of the plate and each engagable with a drive pinion gear 26. The drive pinion gears are mounted on shaft 28 which in turn is rotatably mounted on the gate assembly.

Locking members 30 are mounted on the tops of racks 24 and extend between two teeth in the racks for engagement with pinion gears 26. When the pinion gears engage the locking members, the rotation of the pinion gears and movement of the gate are impeded.

Figure 1:
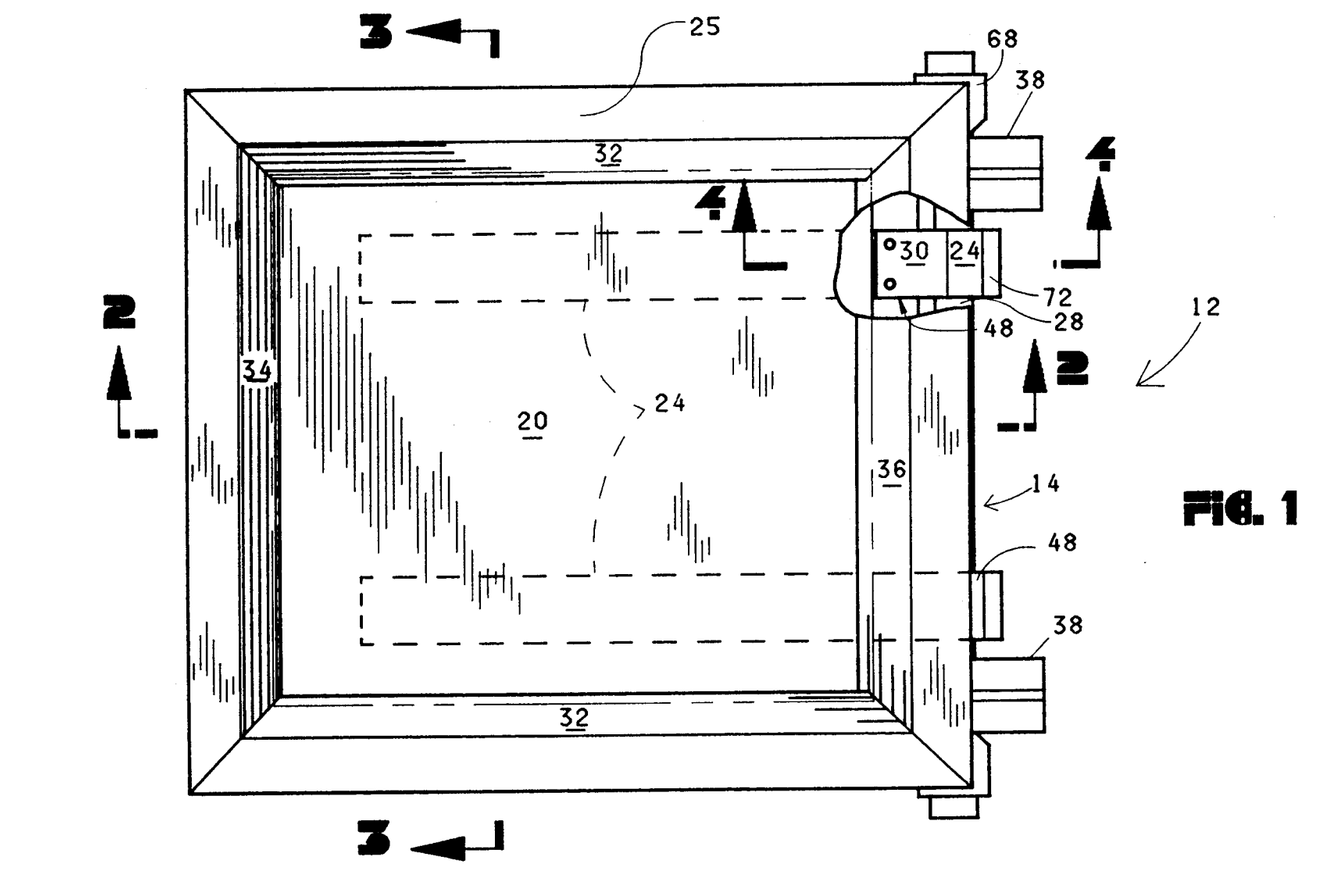
FIG. 1 is a top view, partially broken away, of a hopper unloading gate and a first embodiment lock member according to the invention.

As shown in FIG. 1, hopper frame 14 is rectangular. The frame has a pair of longitudinal walls 32, rear lateral wall 34 and front lateral wall 36. The ends of the rear and front walls are welded to a longitudinal wall. Flange 25 extends around the tops of walls 32, 34 and 36. The hopper gate assembly 10 is mounted to the bottom of the railway hopper car body by a suitable connection at the flange (not shown).

Figure 2:
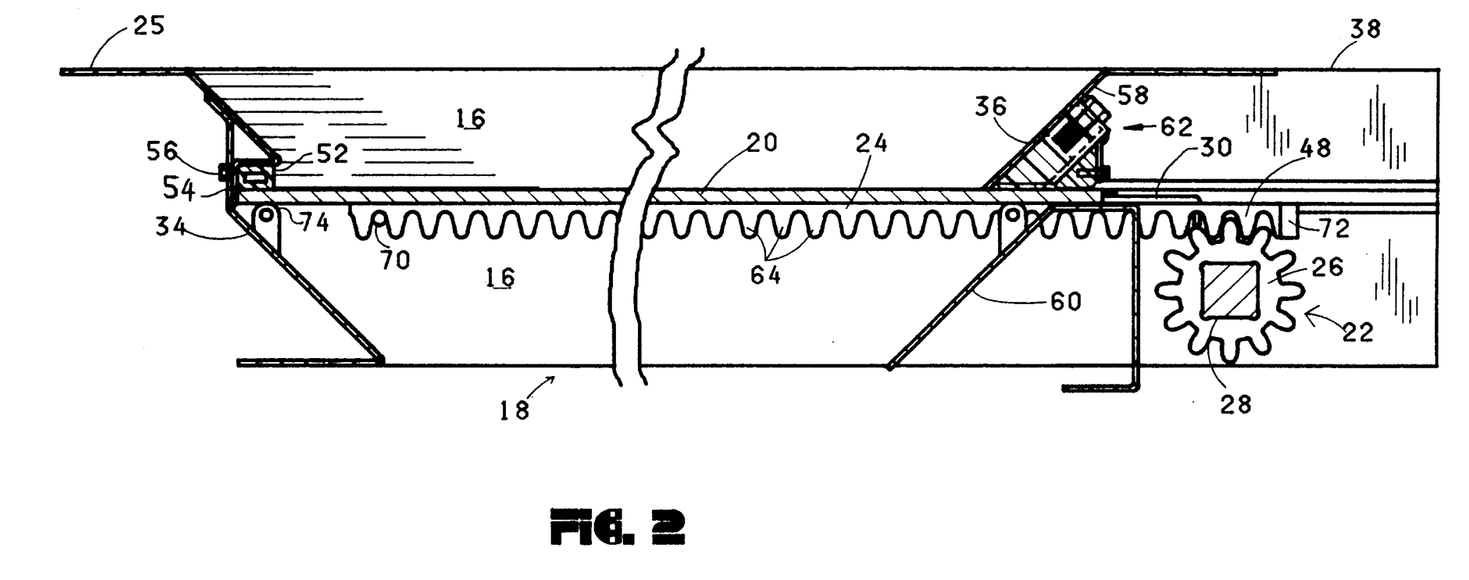
FIG. 2 is a sectional view taken along line 2—2 of FIG. 1.

Elongate grooves 42 extend along the lengths of longitudinal walls 32. As shown in FIG. 2, segments 38 of each longitudinal wall 32 extend outwardly beyond the front wall 36 of the frame. The segments support the plate when the plate is in the open position.

Figure 3:
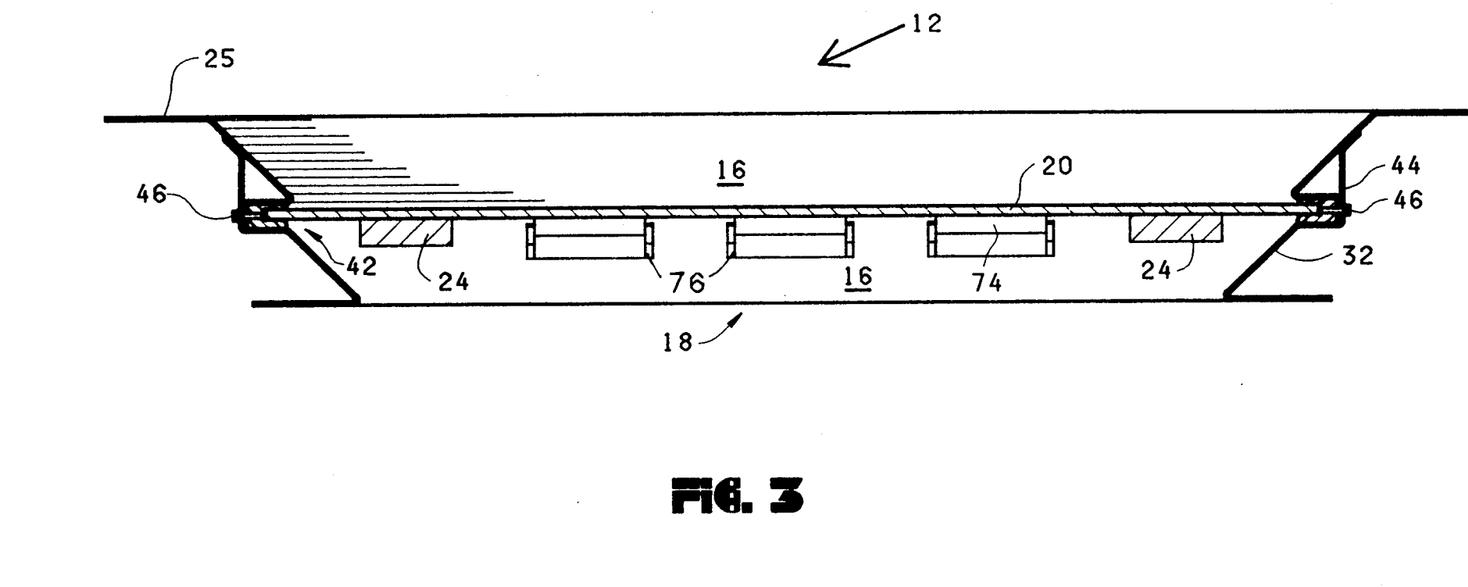
FIG. 3 is a sectional view taken along line 3—3 of FIG. 1.

Elongate U-shaped seals 44 are fitted in grooves 42 formed in walls 32. Screws 46 maintain the seals in the grooves. The U-shaped seals 44 receive the longitudinal edges of plate 20, as shown in FIG. 3. When the gate is closed, the seals prevent the particulate bulk material from spilling out of the hopper gate. As the plate is moved, the plate passes smoothly across the bottom of the seals.

The rear lateral wall of hopper frame 14 includes elongate seal 52 shown in FIG. 2. The seal engages the top of the plate when the plate is in the closed position, preventing loss of the bulk material through the hopper gate. The seal 52 is fastened to the wall by screws 56.

The front lateral wall 36 of hopper frame 14 includes upper wall 58 and lower front wall 60. As shown in FIG. 3, the upper and lower front walls are separated by a slot through which the plate 20 is moved.

A conventional seal unit 62 is welded to the outside of the upper front wall 58 and includes a seal member which is biased downward by springs against the top of plate 20. The seal unit prevents loss of particulate bulk material between the upper front wall and plate 20.

Figure 4:
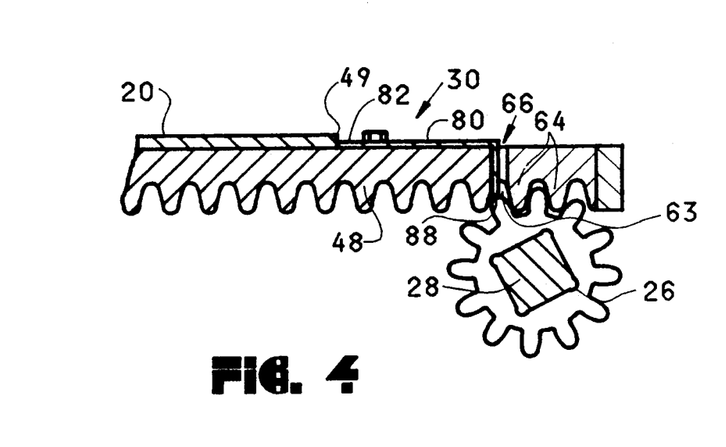
FIGS. 4 and 5 are sectional views taken generally along line 4—4 of FIG. 1, showing the operation of first embodiment of the invention.

Plate 20 is moved between the opened and closed positions by ear drive 22. Two linear racks 24 of the drive are welded to the bottom of plate 20 and each has a plurality of linearly spaced teeth 64 engagable with the teeth of drive pinion gears 26. Each rack extends longitudinally in the direction of movement of plate 20. As shown in FIG. 4, a segment 48 of the length of each rack extends outwardly beyond plate edge 49. When the plate is moved across the mouth to the closed position, the segments of the rack which extend beyond the plate remain outside of the frame above gears 26.

Figure 5:
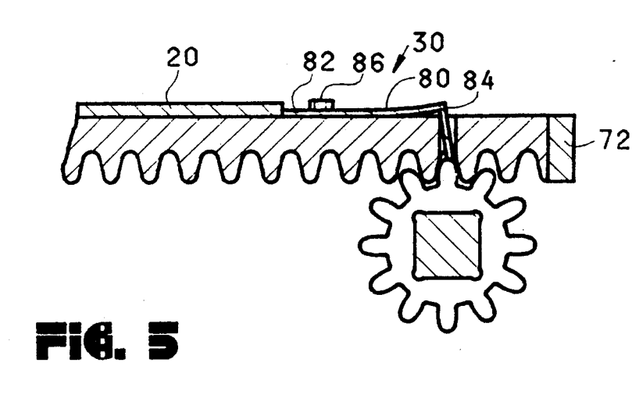

As shown in FIGS. 4 and 5, a slot 66 extends through the body of each rack segment 48 between rack teeth 64. A cylindrical stop member 70 is welded to each rack between adjacent rack teeth at the rear of each rack, as shown in FIG. 2. The stops limit the outward movement of the rack and plate by preventing rotation of pinion gears 26 when pinion gear teeth engage the stops. A stop block 72 is welded to the front of each rack. The blocks limit the movement of the plate to the closed position by stopping the rotation of pinion gears 26 when pinion teeth engage the block.

Cylindrical rollers 74 are mounted on walls 34 and 60 to support the ends of plate 20. As the plate is moved, the plate is supported by the rollers and smoothly slides across the roller surface.

Shaft 28 extends laterally below racks 24 and is journalled in bearings mounted on the assembly 12. Each pinion gear is fixed on the shaft at a location directly below a rack so that the gears engage the racks. An operating socket 68 is provided on each end of shaft 28. The operating socket receives a tool for rotating the shaft. The tool may be a crowbar, hand crank or hydraulic motor. The torque applied to the end of the shaft by the tool rotates the gears to open and close the gate assembly. By mounting a socket to each end of the shaft, a railman is able to insert the tool in the socket which is most accessible.

Hopper gate assembly 12 includes an L-shaped cantilever locking member 30 on the top of each rack 24. Each member has an elongate metal spring leg 80 with a fixed end 82 fastened to the top of the rack by screws 86, and a short contact leg 84 extending 90 degrees away from the other end and into slot 66. The leg 80 may extend to either side of slot 66 as desired.

The locks function identically so that as the description proceeds, the operation of one lock will be described.

Locking members 30 are normally positioned as shown in FIG. 4 with spring legs 80 resting flush on the tops of the rack segments 48 and contact legs 74 extending down through the slots 66 the free ends 88 protruding into the valley or spaces 63 between the adjacent rack teeth 64 occupied by teeth of the pinion gears upon movement of the plate 20 toward the open position.

FIG. 4 illustrates the position of the rack and pinion gears when plate 20 is in the closed position. The pinion gear teeth engage rack teeth located between slot 66 and block 72. As illustrated, the free end 88 of contact leg 84 is located in valley 63 immediately above but free of teeth of the pinion gear so that any initial accidental movement of the plate 20 toward the open position rotates the pinion gear and brings these teeth on the gear into abutting engagement with end 88. The relatively stiff locking member 30 prevents accidental opening of the plate 20 by resisting movement of the teeth on the pinion into the spaces or valleys between rack teeth to either side of slot 66, thus forming an effective lock holding the plate closed during transport of the loaded hopper car.

When the filled hopper car has been moved to an unloading destination, a relatively high torque is applied to shaft 28 to rotate the shaft in a clockwise direction as shown in FIGS. 4 and 5. The torque is sufficient to bring the teeth on the pinion gear into engagement with locking member end 88 and flex the spring leg 80 thereof up from the normal position shown in FIG. 4 to the elevated or stressed position shown in FIG. 5 and permit movement of the rack to the right of shaft-28 to shift plate 20 to the right and open the gate assembly.

Outward displacement of the rack and plate is limited by stop 70. The pinion gear tooth engages the stop terminating the outward displacement of the rack and plate.

After the hopper car has been unloaded the plate is moved from the open position to the closed position, and a constant torque is again applied to socket 68 causing shaft 28 and pinion gear 24 to rotate counterclockwise. The contact leg impedes the rotation of the pinion gear as previously described. The inward displacement of the plate is limited by block 72. The pinion gear tooth engages the block terminating the inward displacement of the plate.

Figure 6:
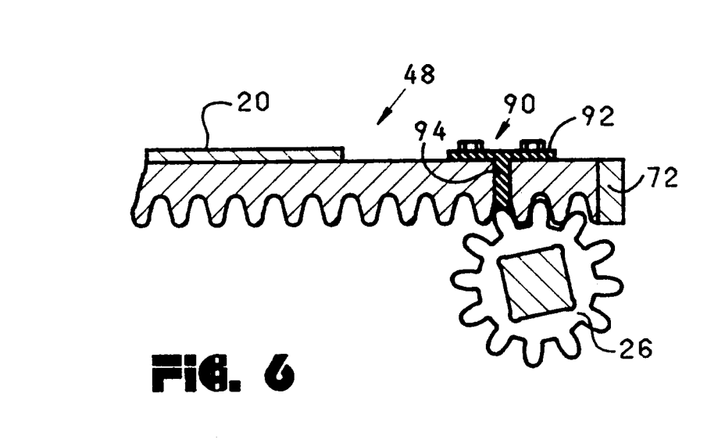
FIGS. 6 and 7 are sectional views like FIGS. 4 and 5 showing a second embodiment of the invention.
Figure 7:
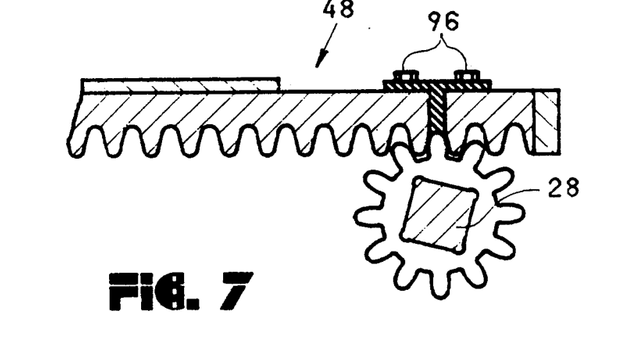

The second embodiment of the present invention shown in FIGS. 6 and 7 is similar to the first embodiment but uses different locking members. It operates identically to the first embodiment.

Locking members 90 of the second embodiment each have a solid spring body 94 made of a resilient elastomeric material such as a rubber or plastic. The locking members are identical so that as the disclosure proceeds one locking member will be described.

As shown in FIG. 6, the compressible spring body 94 of the locking member joins a flat base 92 which is fastened to the top of the rack by screws 96. The body is tightly fitted within slot 66 of rack 24 between adjacent rack teeth 64. The spring body is compressed laterally by the walls of the slot. The bottom of spring body 94 in the valley between adjacent rack teeth 64 is wide and uncompressed. This tight fit allows the spring body to be compressed vertically without flexing, when a tooth of the pinion gear engages the bottom of the spring body.

Plate 20 is moved to the open position as previously described. Opening of the gate is impeded when a tooth of the pinion gear engages the end of spring body 94 of locking member 90. This engagement is shown in FIG. 7. Increased torque must be applied to the end of the shaft in order to compress the spring body outward from its location in the valley between adjacent rack teeth and move the pinion past the spring body. The spring body is compressed vertically. The pinion gear then rotates past the spring body and the plate is moved to the open position until a tooth of the pinion gear engages stop member 70. Locking members 90 prevent accidental opening of the gate assembly.

Figure 8:
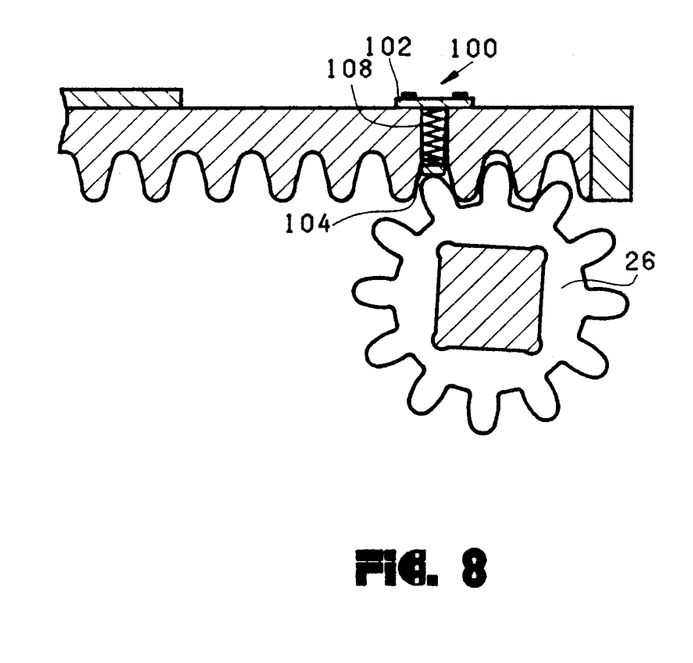
FIGS. 8 and 9 are sectional views like FIGS. 4 and 5, showing a third embodiment of the invention.
Figure 9:
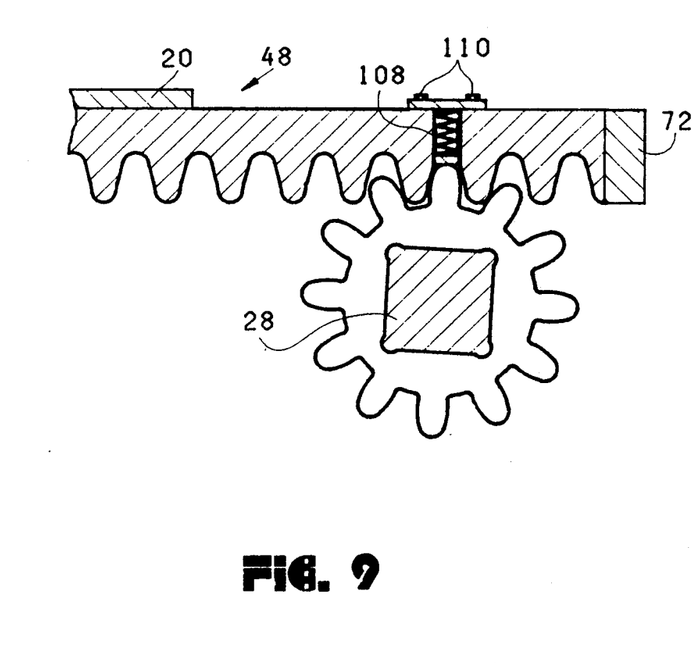
Figure 10:
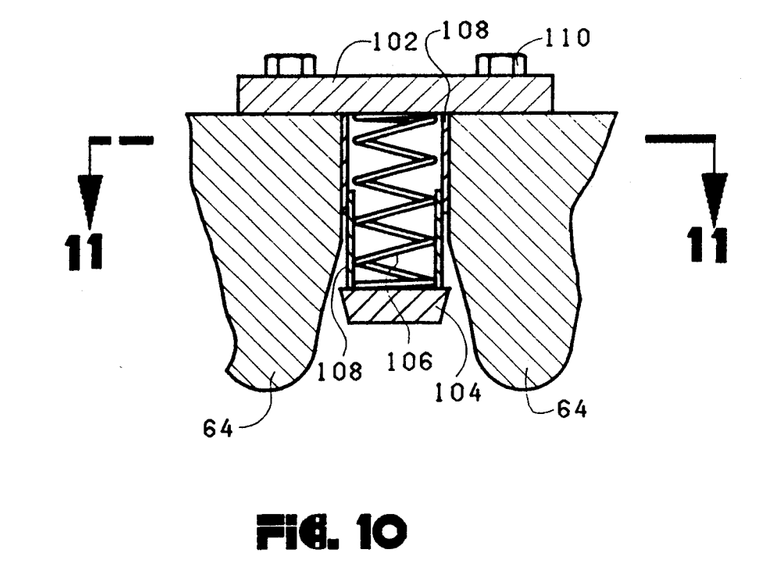
FIG. 10 is an enlarged view of a portion of FIG. 10.
Figure 11:
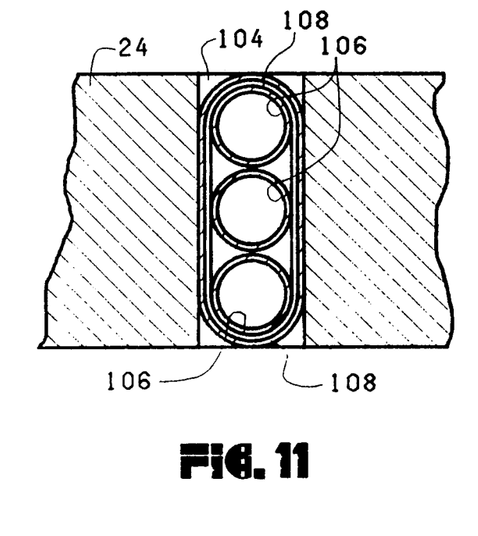
FIG. 11 is a sectional view taken along line 11—11 of FIG. 10.

The third embodiment of the present invention shown in FIGS. 8 to 10 is identical to the first embodiment but uses a coil spring locking member 100 mounted on the top of each rack 24. The locking members are identical so as the disclosure proceeds, one lock will be described. The member includes three separate vertically oriented linear coil springs 106 which extend through slot 66 between adjacent rack teeth 64 and into valley 63 between adjacent rack teeth. Each spring joins support plate 82 along the top and contact plate 104 along the bottom. Support plate 82 is fastened to the top of rack 24 by screws 110.

A two member collapsible sleeve 108 surrounds the springs. The upper member of the sleeve joins the support plate and the lower member of the sleeve joins contact plate 104. The sleeve orients the springs and allows each spring to be compressed without lateral bending. The springs are compressed as contact plate 104 is moved upward upon engagement by a tooth of a gear as shown in FIG. 9.

A torque is applied at socket 68, causing shaft 28 and pinion gears 26 to rotate clockwise moving plate 20 to the open position.

Opening the gate is impeded as a tooth of the pinion gear engages contact plate 104 as previously described. As the torque applied to the shaft is increased, the springs and sleeve are compressed between the teeth of the rack, the pinion tooth rotates past the contact plate, and the plate is moved to the open position. The movement of the plate continues until a pinion gear tooth engages stop member 70. The locking members prevent accidental opening of the gate assembly.

The invention has been described in connection with a gate assembly using a rack and pinion gear drive for moving the plate between the opened and closed positions. Other types of gear drives may be used to open and close gate assemblies. It is contemplated that these gear drives may be provided with locking members of the type disclosed in order to prevent accidental opening.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A gate assembly for a railway hopper car, said assembly comprising:
    A) a frame defining a discharge mouth;
    B) a closure mounted on the frame adjacent the mouth, said closure being movable between a closed position where the mouth is closed to prevent discharge of material through the mouth, and an open position where the mouth is open to allow discharge of material through the mouth; and
    C) a gear drive for moving the closure between the open and closed positions, the drive including
        i) a rack including a plurality of spaced rack teeth;
        ii) a pinion gear having a plurality of circumferentially spaced pinion gear teeth, the teeth of said pinion gear engaging the rack teeth; and
        iii) a resilient lock member extending into a space between a pair of adjacent rack teeth for engagement with a tooth of the pinion gear upon operation of said gear drive.

2. A gate assembly as in claim 1 including a slot extending through the rack and opening into the space, the spring member extending through the slot and including a free end located in the space.

3. A gate assembly as in claim 2 wherein the spring member is L-shaped and includes a short contact leg extending through the slot and into the space and a long cantilever spring leg and including mounting means securing the cantilever leg relative to the rack.

4. A gate assembly as in claim 3 wherein the cantilever spring leg overlies said space and an end of the cantilever spring leg is secured to the rack.

5. A gate assembly as in claim 2 wherein the spring member includes a linear spring.

6. A gate assembly as in claim 5 wherein at least a part of said linear spring is located within said slot.

7. A gate assembly as in claim 6 wherein the spring member includes a plurality of linear springs.

8. A gate assembly as in claim 7 including a collapsible sleeve surrounding the linear springs a free end of said collapsible sleeve comprises a contact plate facing the space.

9. A gate assembly as in claim 1 wherein said spring member comprises an elastomeric body.

10. A gate assembly as in claim 9 including a slot in the rack extending into said space, and said spring member includes a first portion fitted within the slot and a second portion extending into said space.

11. A gate assembly as in claim 10 wherein said second portion is normally spaced away from adjacent walls of the adjacent rack teeth.

12. A gate assembly as in claim 1 wherein said closure comprises a plate having side edges and an end edge, said frame includes plate mounting means including guide slots with the plate edges fitted in the slots and said gear drive moves the plate back and forth along said slots between the opened and closed positions.

13. A gate assembly as in claim 12 wherein said rack is mounted on the plate.

14. A gate assembly as in claim 13 wherein the rack includes a segment extending past said end edge of the plate and said space is located between rack teeth on said segment.

15. A gate assembly as in claim 14 including a slot extending through the rack and opening into said space and wherein the lock member is L-shaped and includes a contact leg extending through the slot and into the space and an elongate cantilever leg overlying the top of the segment of the rack, a free end of said cantilever leg being secured to the rack.

16. A gate assembly as in claim 1 wherein said resilient lock member is located on the rack on a path of movement of the pinion gear and immediately adjacent the position of the pinion gear when the closure is in the closed position.

17. A gate assembly for a railway hopper car, said assembly comprising:
A) a frame defining a discharge mouth;
B) a closure mounted on the frame adjacent the mouth, said closure being movable between a closed position where the closure closes the mouth and prevents discharge through the mouth and an open position where the mouth is open to allow discharge of material through the mouth; and
C) a gear drive for moving the closure between the open and closed positions, the drive including
i) a first gear having a plurality of spaced first teeth;
ii) a second gear having a plurality of spaced second gear teeth, said gears being engaged by said first teeth meshed with said second teeth; and
iii) a resilient lock member located in a space between a pair of adjacent first gear teeth for engagement with one of said second gear teeth upon operation of said gear drive so as to resist movement of the second gear relative to the first gear.

18. A gate assembly as in claim 17 wherein one of said gears is a pinion and the other of said gears is a rack.

19. A gate assembly as in claim 17 wherein said lock member is located on a path of movement of the second gear relative to the first gear and immediately adjacent to the position of the second gear when the closure is in the closed position.

20. A gate assembly as in claim 17 wherein said first gear comprises a rack and the second gear comprises a pinion.

21. A gate assembly as in claim 20 wherein the lock member is located on the rack for engagement with the teeth of the second gear upon initial movement of the closure away from the closed position.

22. A gate assembly, as in ,claim 21 wherein said closure comprises a plate, the frame includes slots, receiving side edges of the plate and the gear drive moves the plate along the slots between the open and closed positions.

23. A gate assembly as in claim 22 wherein said rack is mounted on the plate.

24. A gate assembly as in claim 23 wherein a segment of the rack extends outwardly of the plate, and said lock member is mounted on said segment adjacent the position of the pinion gear when the plate is in the closed position.

* * * * *